United States Patent [19]
Tamura et al.

[11] Patent Number: 5,896,278
[45] Date of Patent: Apr. 20, 1999

[54] NON-CONTACT ELECTRIC POWER TRANSMISSION APPARATUS

[75] Inventors: Hideki Tamura; Mikihiro Yamashita; Yoshinori Katsura, all of Shiga, Japan

[73] Assignee: Matsushita Electric Works, Ltd., Osaka, Japan

[21] Appl. No.: 09/028,497

[22] Filed: Feb. 24, 1998

[30] Foreign Application Priority Data

Mar. 26, 1997 [JP] Japan ................... 9-074134

[51] Int. Cl.$^6$ .................. H02M 3/335; H02J 1/10; H01H 31/34
[52] U.S. Cl. .................. 363/20; 363/21; 307/44; 307/97
[58] Field of Search .................. 363/20, 21, 16, 363/17, 97; 307/44, 48, 84, 97

[56] References Cited

U.S. PATENT DOCUMENTS

| | | | |
|---|---|---|---|
| 3,925,772 | 12/1975 | Miller et al. | 363/37 |
| 4,187,536 | 2/1980 | Govaert et al. | 363/21 |
| 4,318,008 | 3/1982 | Nall | 307/84 |

FOREIGN PATENT DOCUMENTS

6-311658  11/1994  Japan .

Primary Examiner—Peter S. Wong
Assistant Examiner—Rajnikant B. Patel
Attorney, Agent, or Firm—Oblon, Spivak, McClelland, Maier & Neustadt, P.C.

[57] ABSTRACT

A non-contact electric power transmission apparatus including a power supply unit and a load unit. The power supply unit has a first oscillation circuit, a signal secondary winding, a filter circuit, and a driving control circuit. The load unit has a power secondary winding, a signal primary winding, and a second oscillation circuit. The first oscillation circuit has a power primary winding and intermittently oscillates at a first oscillation frequency. When the load unit is placed at a predetermined position with respect to the power supply unit, since signals are induced in the power secondary winding by the signals in the power primary winding, the second oscillation circuit oscillates at a second oscillation frequency which is different from the first oscillation frequency. The signals from the second oscillation circuit are transmitted from the signal primary winding to the signal secondary winding. When the signals having the second oscillation frequency is input from the signal secondary winding to the driving control circuit through the filter circuit, the driving control circuit controls the first oscillation circuit to successively oscillates.

16 Claims, 8 Drawing Sheets

NON-CONTACT ELECTRIC POWER TRANSMISSION APPARATUS

BACKGROUND OF THE INVENTION

1. Field of the Invention

The present invention relates to a non-contact electric power transmission apparatus for transmitting electric power electromagnetically from a power supply unit to a load unit.

2. Description of the Related Art

In the present application, priority under 35 U.S.C. 119 is requested based on Japanese Patent Application No. 9-74, 134, filed Mar. 26, 1997, entitled "Non-contact Electric Power Transmission Apparatus". The contents of that application are incorporated herein by reference.

A non-contact electric power transmission apparatus is disclosed in Japanese Unexamined Patent Publication (kokai) 6-311,658, entitled "Small Electric Appliances". The contents of that application are incorporated herein by reference. In this apparatus, referring to FIG. 14, when a load unit 2 having a power secondary winding L3 is properly positioned at a predetermined position with respect to a power supply unit 1 having a power primary winding L1 such that the power primary winding L1 and the power secondary winding L3 are electromagnetically connected each other, electric power is transmitted from the power primary winding L1 to the power secondary winding L3. The power supply unit 1 includes a diode D0 and a smoothing capacitor C0 so as to rectify and smooth the current from a commercial power supply AC. The power supply unit 1 further includes an LC resonant circuit and a transistor Q1 as a switching element. The LC resonant circuit includes an oscillation capacitor C1 and a power primary winding L1 for transmitting electric power to a power secondary winding L3 of the load unit 2. The series circuit of the LC resonant circuit, the transistor Q1, and a resistor R2 is connected in parallel to the smoothing capacitor C0. A series circuit of a resistor R1 and a capacitor C2 is also connected to the smoothing capacitor C0 in parallel. A base of the transistor Q1 and the connection point between the resistor R1 and the capacitor C2 are connected via a feedback coil L0 which is electromagnetically connected to the power primary winding L1.

Figure 14:
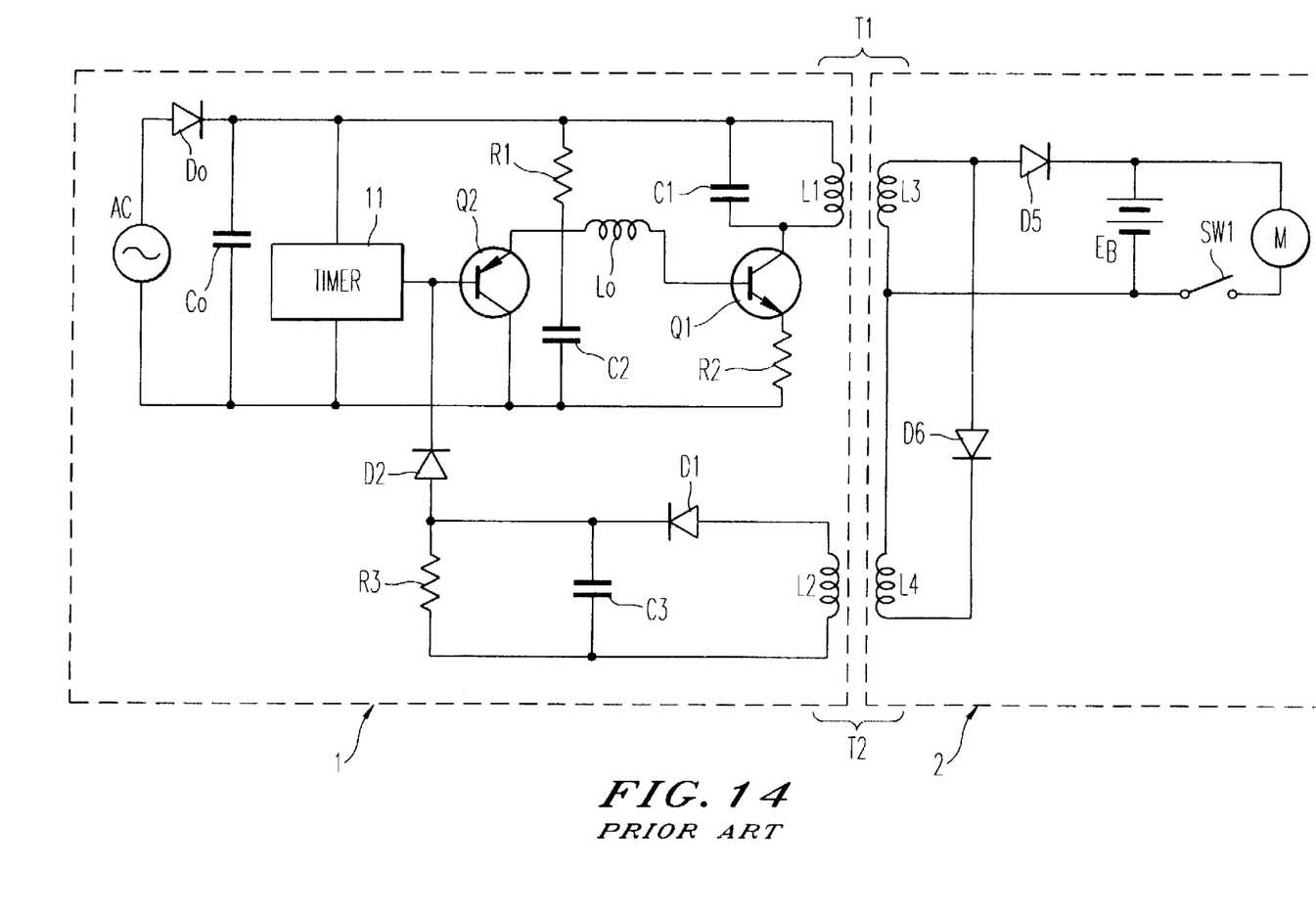
FIG. 14 is a circuit diagram of a conventional non-contact electric power transmission apparatus.

The load unit 2 includes the power secondary winding L3. Electric power is induced in the power secondary winding L3 by electromagnetic induction between the power primary winding L1 and the power secondary winding L3. The power secondary winding L3 is connected to a secondary battery EB via a diode D5. The voltage induced in the power secondary winding L3 is rectified by the diode D5 and then charged in the secondary battery EB. The secondary battery EB is connected to a load M, for example, a direct-current motor via a switch SW1 which is operated by an operation unit (not shown). The power secondary winding L3 is connected to a signal primary winding L4 via a diode D6.

When the load unit 2 is not positioned at the predetermined position with respect to the power supply unit 1, voltage is intermittently supplied to the power primary winding L1. When the load unit 2 is positioned at the predetermined position with respect to the power supply unit 1, voltage is induced in the power secondary winding L3 by the voltage intermittently supplied to the power primary winding L1. The induced voltage is applied to the signal primary winding L4 and transmitted from the signal primary winding L4 to the signal secondary winding L2 by electromagnetic induction. When voltage is induced in the signal secondary winding L2, electric power is successively supplied to the power primary winding L1 and electric power can be transmitted from the power primary winding L1 to the power secondary winding L3.

In this apparatus, however, if the signal secondary winding L2 is positioned close to the power primary winding L1, since voltage is induced in the signal secondary winding L2 by the voltage supplied to the power primary winding L1, the problem arises in that it cannot be exactly determined whether the load unit 2 is positioned at the predetermined position with respect to the power supply unit 1. Accordingly, since the signal secondary winding L2 cannot be positioned close to the power primary winding L1, the signal primary winding L4 cannot be positioned close to the power secondary winding L3. Therefore, the problem arises in that the size of the apparatus cannot be reduced.

SUMMARY OF THE INVENTION

An object of the present invention is to provide a non-contact electric power transmission apparatus in which the size of the apparatus can be reduced.

The object is achieved according to the present invention by providing a new non-contact electric power transmission apparatus including a power supply unit and a load unit. The power supply unit includes a first oscillation circuit, a signal secondary winding, a filter circuit connected to the signal secondary winding, and a driving control circuit. The first oscillation circuit has a power primary winding and is adapted to be able to oscillate at a first oscillation frequency. The filter circuit is adapted to extract positioning signals from signals induced in the signal secondary winding. The driving control circuit controls the first oscillation circuit such that the first oscillation circuit intermittently oscillates when the driving control circuit does not receive the positioning signals from the filter circuit and such that the first oscillation circuit successively oscillates when the driving control circuit receives the positioning signals from the filter circuit. The load unit includes a power secondary winding, a signal primary winding, and a second oscillation circuit. The power secondary winding and the signal primary winding are adapted to be electromagnetically connected to the power primary winding and the signal secondary winding respectively when the load unit is placed at a predetermined position with respect to the power supply unit. The second oscillation circuit is adapted to be able to oscillate at a second oscillation frequency. The second oscillation frequency is different from the first oscillation frequency. Further, the second oscillation circuit is adapted to output signals having the second oscillation frequency to the signal primary winding when signals are induced in the power secondary winding and input to the second oscillation circuit. The filter circuit is adapted to extract signals having the second oscillation frequency as the positioning signals.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

The preferred embodiments will now be described with reference to the accompanying drawings, wherein like reference numerals designate corresponding or identical elements throughout the various illustrations.

Figure 1:
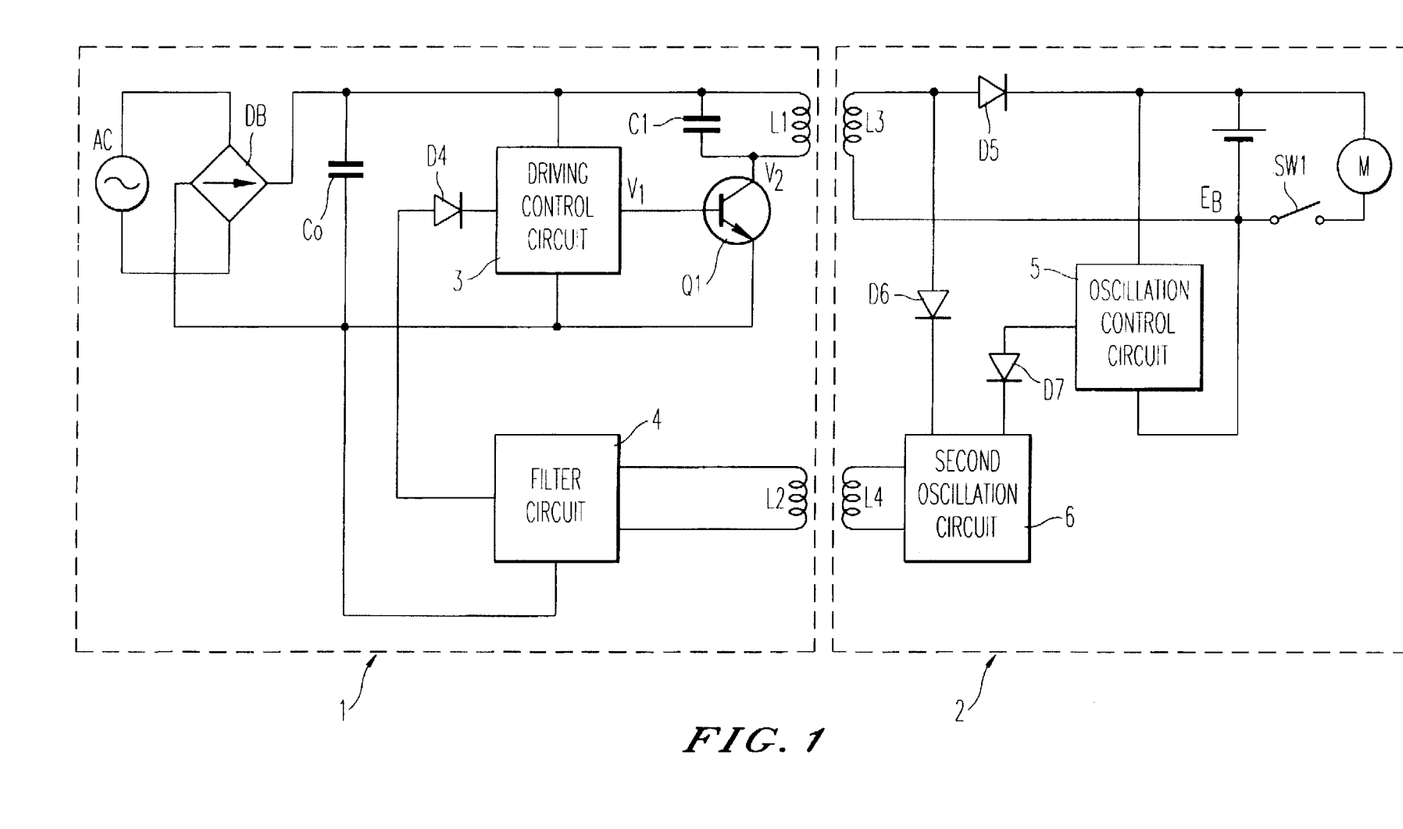
FIG. 1 is a circuit diagram of a non-contact electric power transmission apparatus according to a first embodiment of the present invention.

FIG. 1 shows a circuit diagram of a non-contact electric power transmission apparatus according to a first embodiment of the present invention. The non-contact electric power transmission apparatus includes a power supply unit 1 and a load unit 2. The load unit 2 is, for example, an electric shaver, an electric toothbrush and the like. When the load unit 2 is placed at a predetermined position with respect to the power supply unit 1, the power supply unit 1 detects the load unit 2 and electric power is transmitted from the power supply unit 1 to the load unit 2, for example, a battery included in the load unit 2.

The power supply unit 1 includes a diode bridge DB and a smoothing capacitor C0 so as to rectify and smooth the current from a commercial power supply AC. The power supply unit 1 further includes a first oscillation circuit and a driving control circuit 3 which are parallely connected to the smoothing capacitor C0, respectively. The first oscillation circuit includes an LC resonant circuit having an oscillation capacitor C1 and a power primary winding L1 for transmitting electric power to a power secondary winding L3 of the load unit 2. The first oscillation circuit further includes a transistor Q1 as a switching element which is in series connection with the LC resonant circuit. The driving control circuit 3 controls the transistor Q1 so as to control an amount of electric power to be transmitted from the power primary winding L1 to the power secondary winding L3 of the load unit 2. A signal secondary winding L2 for receiving signals output from a signal primary winding L4 in the load unit 2 is connected to a filter circuit 4 which is connected to the driving control circuit 3 via a diode D4.

The load unit 2 includes the power secondary winding L3. The power secondary winding L3 is connected to a secondary battery EB via a diode D5. The electric power transmitted from the power primary winding L1 to the power secondary winding L3 by electromagnetic induction is charged in the secondary battery EB. The secondary battery EB is connected to a load M, for example, a direct-current motor via a switch SW1 which is operated by an operation unit (not shown).

In the load unit 2, the power secondary winding L3 is connected to the signal primary winding L4 via a diode D6 and a second oscillation circuit 6. Further, the load unit 2 includes an oscillation control circuit 5 which is connected to the secondary battery EB and the second oscillation circuit 6 via a diode D7. The oscillation control circuit 5 detects the voltage of the secondary battery EB and outputs a signal to the second oscillation circuit 6 so as to stop the oscillation of the second oscillation circuit 6 when the value of the detected voltage of the secondary battery EB is higher than a predetermined voltage value.

Figure 2:
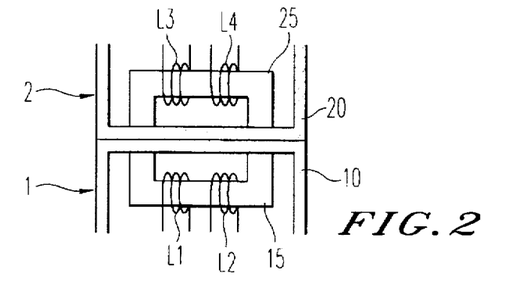
FIG. 2 is a schematic view of a power primary winding L1 and a signal secondary winding L2 wound around a core, and a power secondary winding L3 and a signal primary winding L4 wound around another core.

As shown in FIG. 2, in the present embodiment, the power primary winding L1 and the signal secondary winding L2 are wound around a C-shaped core 15 in a housing 10 of the power supply unit 1, and the power secondary winding L3 and the signal primary winding L4 are wound around another C-shaped core 25 in a housing 20 of the load unit 2.

Figure 3A:
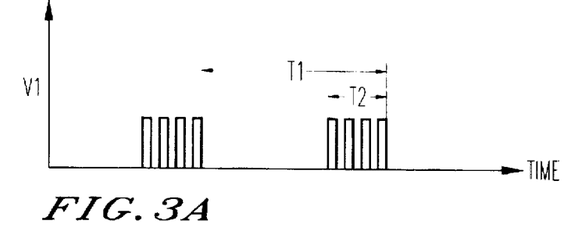
FIGS. 3A and 3B respectively illustrate a waveform of voltage V1 output from a driving control circuit and a waveform of voltage V2 at the connection point between an LC resonant circuit and a connector of transistor Q1 when a load unit is not placed at a predetermined position with respect to a power supply unit.
Figure 3B:
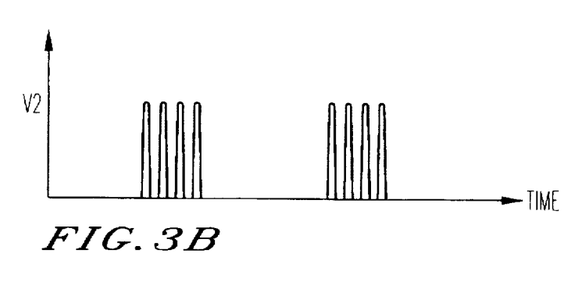

When power is supplied to the power supply unit 1, the driving control circuit 3 intermittently outputs voltage V1 in a form of rectangular pulse as shown in FIG. 3A so as to intermittently operate the transistor Q1. The transistor Q1 is operated during a period T2 in a time cycle of a period T1 (see FIG. 3A). For example, the period T1 is 1 second and the period T2 is 10 millisecond. When the transistor Q1 is operated, oscillation is maintained in the LC resonant circuit. The voltage V2 at the connection point between the LC resonant circuit and a connector of the transistor Q1 is in a form of intermittent sign curve as shown in FIG. 3B.

Figure 4A:
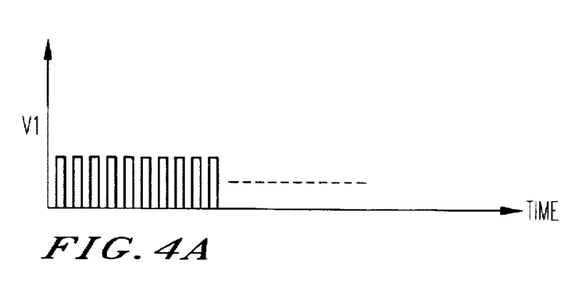
FIGS. 4A and 4B respectively illustrate a waveform of voltage V1 output from a driving control circuit and a waveform of voltage V2 at the connection point between the LC resonant circuit and a connector of transistor Q1 when the load unit is placed at the predetermined position with respect to the power supply unit.
Figure 4B:
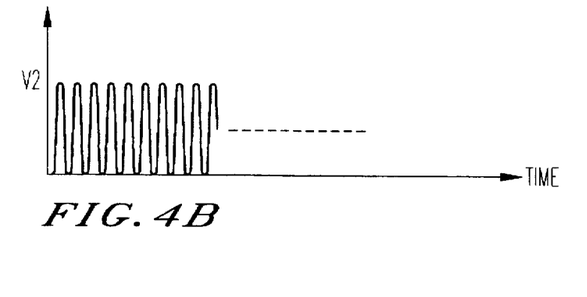

When the housing of the load unit 2 is placed at the predetermined position with respect to the housing of the power supply unit 1 such that the power secondary winding L3 and the signal primary winding L4 is electromagnetically connected to the power primary winding L1 and the power secondary winding L2, respectively, signal voltage is induced in the power secondary winding L3 by the intermittent signals supplied in the power primary winding L1. When the signal voltage induced in the power secondary winding L3 is applied to the second oscillation circuit 6, the second oscillation circuit 6 starts to oscillate. The oscillation signal produced by the second oscillation circuit 6 is transmitted from the signal primary winding L4 to the signal secondary winding L2 by electromagnetic induction. Since the power primary winding L1 is positioned close to the signal secondary winding L2 as shown in FIG. 2, the signal voltage induced in the signal secondary winding L2 is affected by the voltage supplied to the power primary winding L1. Accordingly, the signal voltage induced in the signal secondary winding L2 includes a first oscillation frequency f1 which is an oscillation frequency in the first oscillation circuit and a second oscillation frequency f2 which is an oscillation frequency in the second oscillator circuit 6. The second oscillation frequency f2 is determined so as to be higher than the first oscillation frequency f1. For example, the ratio of the second oscillation frequency f2 to the first oscillation frequency f1 is determined as substantially 20 to 1, and the first oscillation frequency f1 is made, for example, 50 kHz, and the second oscillation frequency f2 is made, for example, 1 MHz. In the power supply unit 1, only signals having frequency f2 are extracted by the filter circuit 4 from the signal voltage induced in the signal secondary winding L2, and the extracted signals are input to the driving control circuit 3 via the diode D4. When the extracted signals are input to the driving control circuit 3, the driving control circuit 3 successively outputs rectangular pulses as shown in FIG. 4A. The voltage V2 at the connection point between the LC resonant circuit and the connector of the transistor Q1 is in a form of successive sign curve as shown in FIG. 4B. Therefore, electric power can be transmitted from the power supply unit 1 to the load unit 2. The voltage induced in the power secondary winding L3 is rectified by the diode D5, and the direct current voltage is charged in the secondary battery EB.

When the oscillation control circuit 5 detects that the voltage value of the secondary battery EB becomes a predetermined voltage value, the oscillation control circuit 5 stops the oscillation of the second oscillation circuit 6. Accordingly, since signals are not input to the driving control circuit 3, the driving control circuit 3 again intermittently outputs voltage as shown in FIG. 3A. Therefore, charging the secondary battery EB is substantially stopped.

According to the present embodiment, when the load unit 2 is not positioned at the predetermined position with respect to the power supply unit 1, the driving control unit 3 intermittently outputs voltage. Accordingly, even if a metal is located close to the power primary winding L1, overheat of the metal can be prevented because electric power is not substantially transmitted from the power primary winding L1 to the metal.

Further, since the first oscillation frequency f1 of the first oscillation circuit is different from the second oscillation frequency f2 of the second oscillation circuit, it can be exactly detected that the load unit 2 is positioned at the predetermined position with respect to the power supply unit 1 by detecting the voltage having the frequency f2. Accordingly, the signal secondary winding L2 can be positioned close to the power primary winding L1, and the signal primary winding L4 can be positioned close to the power secondary winding L3. Therefore, the sizes of the power supply unit 1 and the load unit 2 can be reduced.

Further, in the present embodiment, since the power primary winding L1 and the signal secondary winding L2 are wound around the C-shaped core 15, and the power secondary winding L3 and the signal primary winding L4 are wound around the other C-shaped core 25, the number of cores can be reduced. Accordingly, the costs and sizes of the power supply unit 1 and the load unit 2 can be further reduced. Further, the power supply unit 1 and the load unit 2 may be provided only one core, respectively. Accordingly, since the size of core can be increased, more electric power can be transmitted.

Furthermore, either when the load unit 2 is not positioned at the predetermined position with respect to the power supply unit 1, or when the voltage value of the secondary battery EB becomes the predetermined voltage value, the driving control unit 3 intermittently outputs voltage. Accordingly, the power consumption can be reduced.

In the present embodiment, although the power primary winding L1 and the signal secondary winding L2 are wound around the C-shaped core 15, and the power secondary winding L3 and the signal primary winding L4 are wound around the other C-shaped core 25, respective windings L1, L2, L3, and L4 can be wound around respective cores separately.

Figure 5:
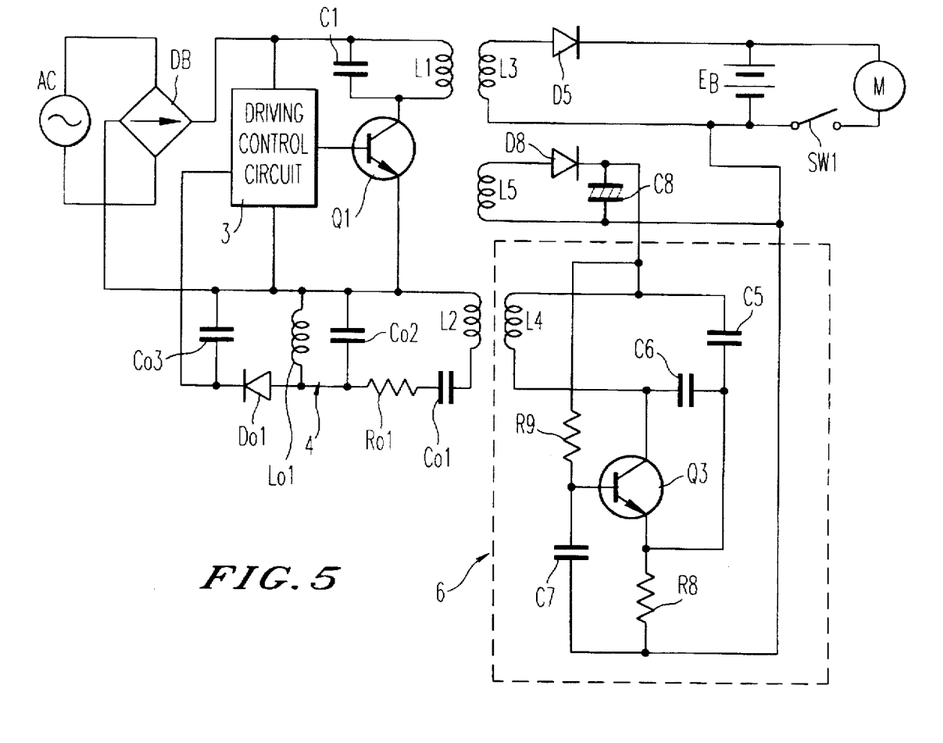
FIG. 5 is a circuit diagram of a non-contact electric power transmission apparatus according to a second embodiment of the present invention.

FIG. 5 represents a second embodiment of the present invention. In the second embodiment, the basic circuit construction and the basic operation are similar to the first embodiment. The second oscillation circuit 6 is constructed as the Colpitts oscillation circuit. The coil L4 in the Colpitts oscillation circuit is wound around the C-shaped core 25 as shown in FIG. 2 and also operates as the signal primary winding L4. Referring to FIG. 5, the filter circuit 4 includes a coil L01, a diode D01, capacitors C01, C02, and C03, and a resistor R01. A power supply circuit for the Colpitts oscillation circuit has a coil L5.

According to the second embodiment, the construction of the second oscillation circuit 6 can be simplified by adopting the Colpitts oscillation circuit. Further, since the coil L4 in the Colpitts oscillation circuit also operates as the signal primary winding L4, the number of parts, the size of the apparatus, and the cost of the apparatus can be reduced.

Figure 6:
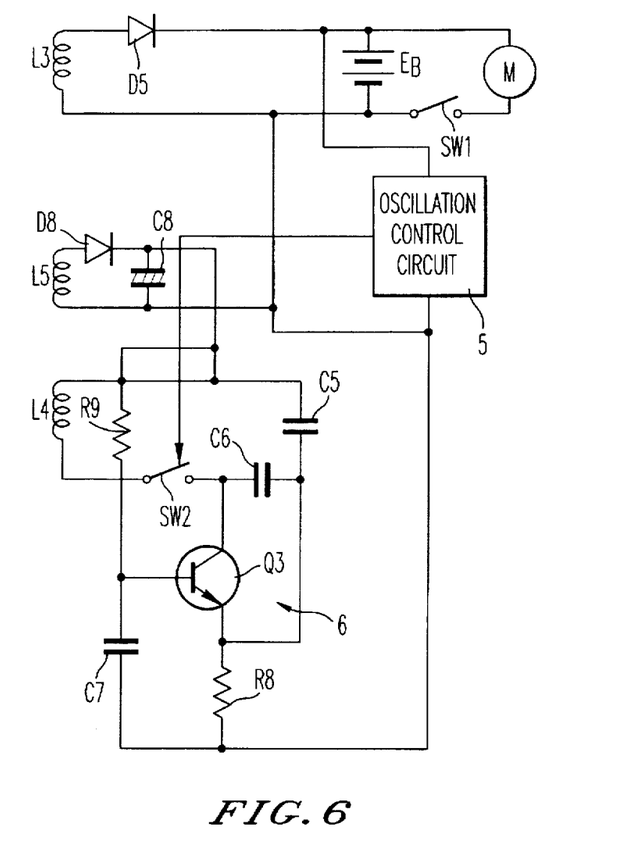
FIG. 6 is an essential portion of a circuit diagram of a non-contact electric power transmission apparatus according to a third embodiment of the present invention.

FIG. 6 represents an essential portion of a third embodiment of the present invention. In the second embodiment as shown in FIG. 5, voltage is induced in the coil L4 of the Colpitts oscillation circuit by the voltage supplied to the power primary winding L1. Accordingly, even though the base bias of the transistor Q3 is made to ground level, electric power is continued to be supplied to the Colpitts oscillation circuit through the coil L4. Accordingly, in the second embodiment, even though the base bias of the transistor Q3 is made to ground level, the Colpitts oscillation cannot be stopped.

On the contrary, in the third embodiment, referring to FIG. 6, a switch SW2 for stopping the oscillation is interposed between the coil L4 and the capacitor C6. Accordingly, when the voltage value of the secondary battery EB becomes the predetermined voltage value, the oscillation control circuit 5 turns off the switch SW2. Therefore, the oscillation in the Colpitts oscillation circuit can be stopped.

Figure 7:
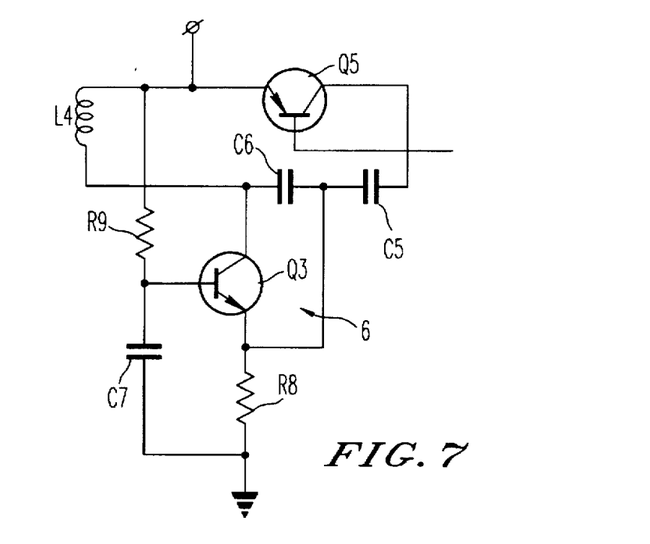
FIG. 7 is a circuit diagram of an oscillation circuit of the non-contact electric power transmission apparatus according to the third embodiment of the present invention.

A pnp type transistor Q5 may be utilized as the switch SW2 as shown in FIG. 7. In this case, the base bias of the pnp type transistor Q5 may be controlled by the oscillation control circuit 5.

Figure 8:
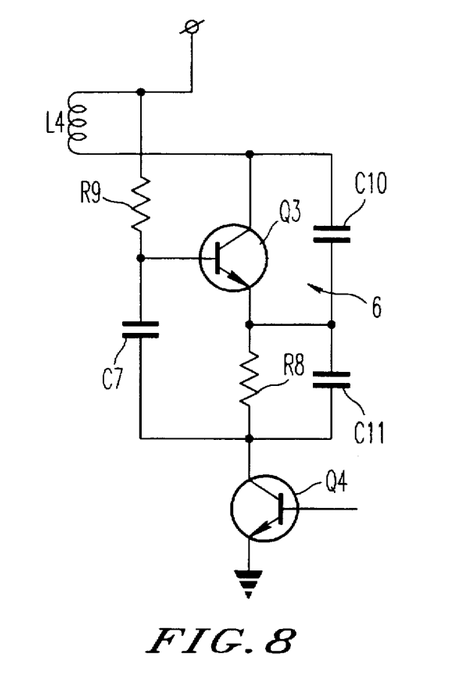
FIG. 8 is an essential portion of a circuit diagram of a non-contact electric power transmission apparatus according to a forth embodiment of the present invention.

FIG. 8 represents an essential portion of a forth embodiment of the present invention. In the third embodiment as shown in FIG. 7, although the oscillation in the Colpitts oscillation circuit can be stopped by providing the pnp type transistor Q5, the cost of the apparatus is increased because the pnp type transistor Q5 is expensive.

On the contrary, in the forth embodiment, referring to FIG. 8, the second oscillation circuit 6 is constructed as Colpitts oscillation circuit having a series resonance circuit. An npn type transistor Q4 as a switching element is provided between ground and a resistor R8 connected to the emitter of the npn type transistor Q3 of the oscillation circuit. The transistor Q4 is turned on and off by the signal input to the base of the transistor Q4 from the oscillation control circuit 5. Accordingly, in the forth embodiment, the cost of the apparatus can be reduced comparing to the apparatus according to the third embodiment because npn type transistors are cheaper than pnp type transistors.

Figure 9A:
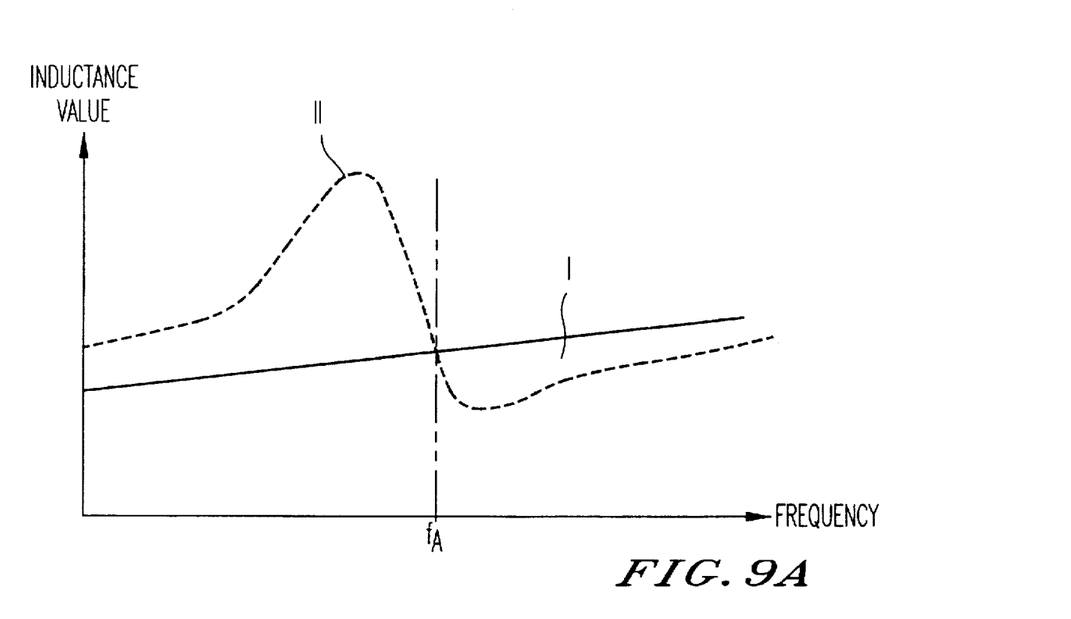
FIG. 9A is a graph of the relationship between an inductance value of the signal primary winding L4 and a frequency of voltage applied to the signal primary winding L4.

By the way, the resonance frequency of the Colpitts oscillation circuit should be stable at a predetermined frequency f2, because the filter circuit 4 pass the second oscillation frequency f2 as a positioning signal and substantially filtered out other frequencies. When the load unit 2 is located at the predetermined position with respect to the power supply unit 1, the inductance of the signal primary winding L4 is changed. Accordingly, when the coil L4 in the Colpitts oscillation circuit also operates as the signal primary winding L4, the inductance of the coil L4 in the Colpitts oscillation circuit is changed. FIG. 9A illustrates the relationship between the inductance value of the signal primary winding L4 and the frequency of voltage supplied to the signal primary winding L4. Referring to FIG. 9A, when the load unit 2 is not located at the predetermined position with respect to the power supply unit 1, the inductance value of the signal primary winding L4 increases according to an increase of the frequency as shown by a solid line I. When the load unit 2 is located at the predetermined position with respect to the power supply unit 1, the inductance value of the signal primary winding L4 changes as shown by a broken line II. With respect to the broken line II, the inductance value of the signal primary winding L4 abruptly changes in the vicinity of a frequency fA, where fA substantially corresponds to a resonance frequency of an oscillation circuit including the power primary winding L1, the signal secondary winding L2, and a floating capacitance between wires.

If the resonance frequency of the Colpitts oscillation circuit corresponds to the frequency fA, since the inductance value of the signal primary winding L4 abruptly changes in accordance with the change of frequency in the vicinity of the frequency fA, the inductance value of the signal primary winding L4 abruptly changes when the frequency is slightly shifted. When the inductance value of the signal primary winding L4 changes, the frequency of voltage supplied to the signal primary winding L4 changes because the signal primary winding L4 also operates as a coil of the Colpitts oscillation circuit. Accordingly, if the oscillation frequency of the Colpitts oscillation circuit is determined as a frequency in the vicinity of the frequency fA, the oscillation frequency easily changes an is unstable. Therefore, it is preferable that the resonance frequency of the Colpitts oscillation circuit is determined so as to be shifted from the frequency fA.

Figure 9B:
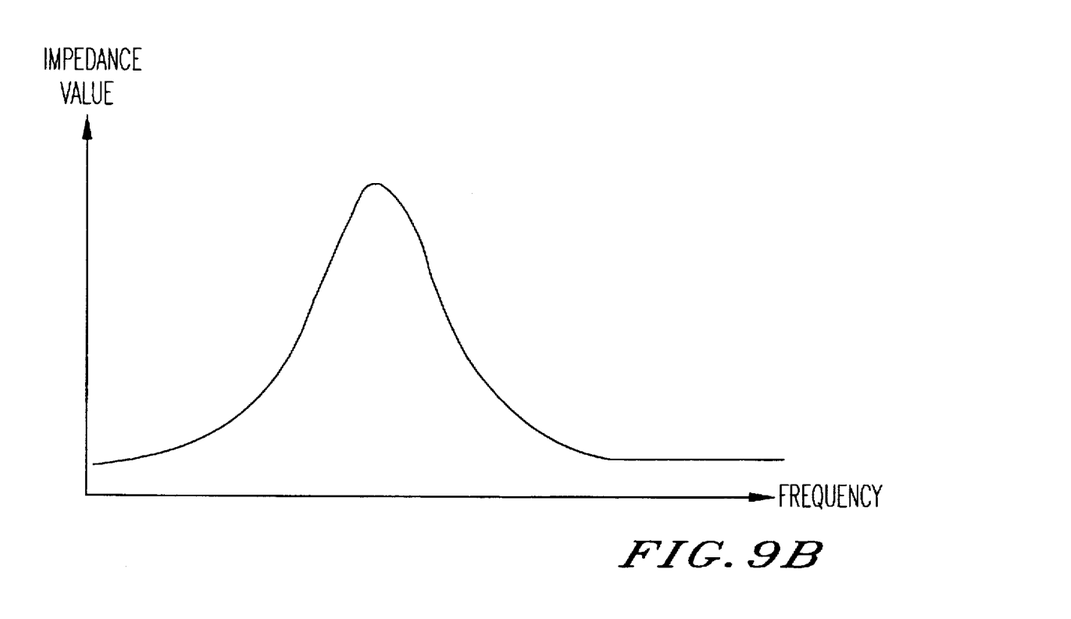
FIG. 9B is a graph of the relationship between an impedance value of the signal secondary winding L2 and a frequency of voltage applied to the signal secondary winding L2.

FIG. 9B illustrates the relationship between the impedance value of the signal the Colpitts oscillation circuit secondary winding L2 and a frequency of the voltage supplied to the signal secondary winding L2. As the impedance of the signal secondary winding L2 increases, the voltage induced in the signal secondary winding L2 becomes higher. As illustrated in FIG. 9B, the signal secondary winding L2 has a maximum impedance value in the vicinity of the frequency fA. Accordingly, the oscillation frequency of the Colpitts oscillation circuit is determined as a frequency such that the oscillation frequency is shifted from the frequency fA and the signal secondary winding L2 still has a high impedance value.

Figure 10:
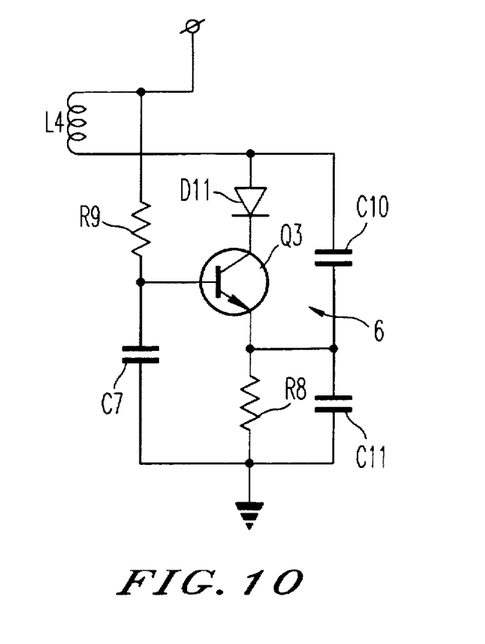
FIG. 10 is an essential portion of a circuit diagram of a non-contact electric power transmission apparatus according to a fifth embodiment of the present invention.

FIG. 10 represents an essential portion of a fifth embodiment of the present invention. Referring to FIG. 10, in the second oscillation circuit 6, a diode D11 is interposed between the signal primary winding L4 and the collector of the driving transistor Q3 in the oscillation circuit 6.

Figure 11:
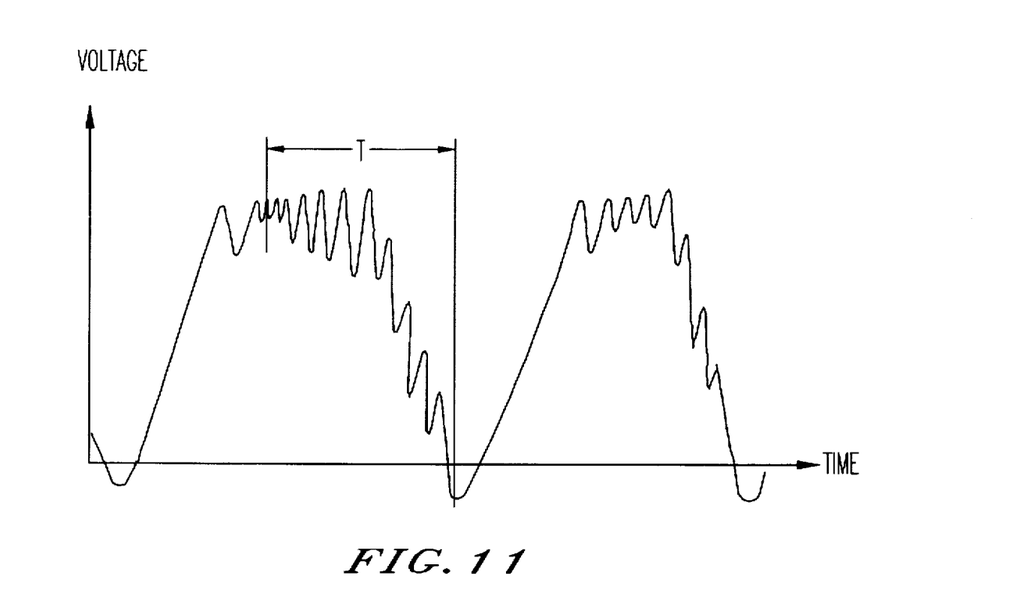
FIG. 11 is an illustration of an waveform of voltage at a collector of a driving transistor Q3 in the non-contact electric power transmission apparatus according to the forth embodiment of the present invention as shown in FIG. 8.

FIG. 11 illustrates a voltage wave at the collector of the driving transistor Q3 where the diode D11 is not provided. Referring to FIG. 11, the voltage at the collector of the driving transistor Q3 is lowered than the grand level in every cycle. During a period during which the voltage level at the collector of the driving transistor Q3 is lower than the grand level, the potential at the base of the driving transistor Q3 becomes negative and thus the driving transistor Q3 is turned off, because current flows from the base to the collector of the driving transistor Q3. Then, even though the potential at the collector is raised, the potential at the base is gradually raised because of a RC time constant determined by a resistor R9 and a capacitor C7. Accordingly, since the timing that the driving transistor Q3 is turned on is delayed, the Colpitts oscillation circuit oscillates only during period T as shown FIG. 11.

Figure 12:
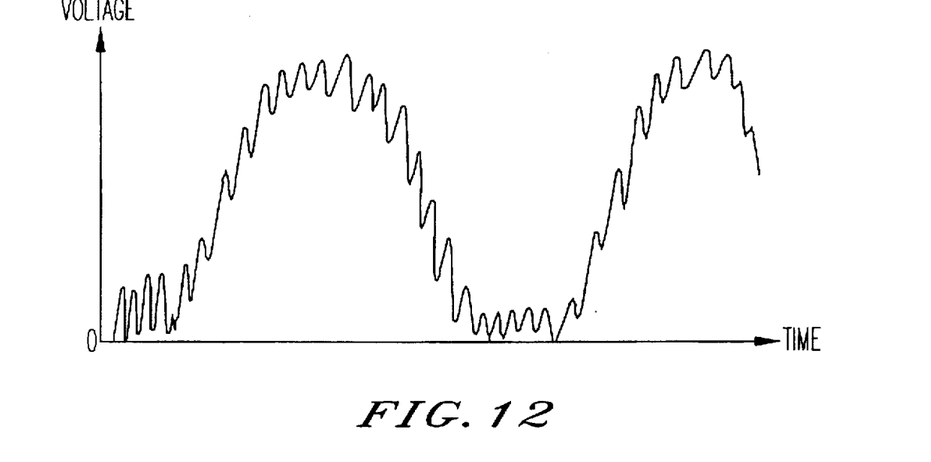
FIG. 12 is an illustration of an waveform of voltage at a collector of a driving transistor Q3 in the non-contact electric power transmission apparatus according to the fifth embodiment of the present invention as shown in FIG. 10.

On the contrary, in the fifth embodiment as shown in FIG. 10, the voltage level at the collector of the driving transistor Q3 does not become lower than the grand level as shown in FIG. 12, because the diode D11 is interposed between the signal primary winding L4 and the collector of the driving transistor Q3. Accordingly, successive Colpitts oscillation can be obtained. Therefore, the positioning signal can be certainly transmitted from the load unit 2 to the power supply unit 1.

Figure 13:
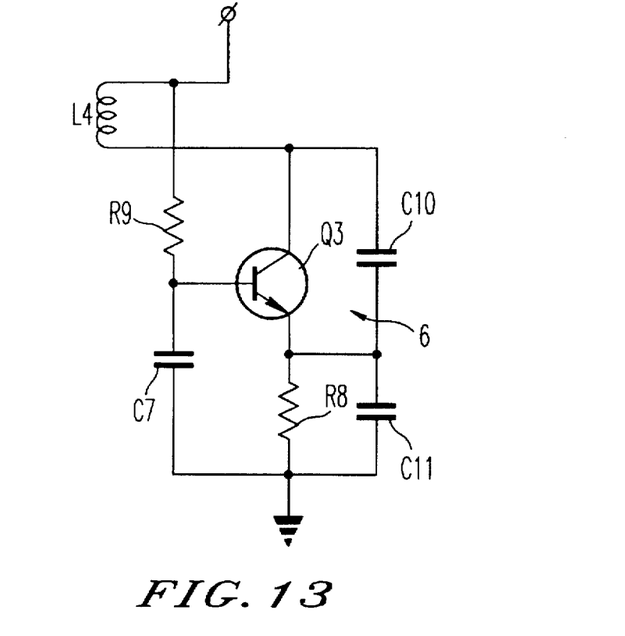
FIG. 13 is an essential portion of a circuit diagram of a non-contact electric power transmission apparatus according to a sixth embodiment of the present invention.

FIG. 13 represents an essential portion of a sixth embodiment of the present invention. Referring to FIG. 13, the second oscillation circuit 6 does not include a diode D11 as shown in FIG. 10. In the second oscillation circuit 6, the signal primary winding L4 is directly connected to the collector of the driving transistor Q3. A RC time constant when the potential at the base of the driving transistor Q3 is raised is determined so as to be much shorter than a cyclic period of the oscillation in the Colpitts oscillation circuit. The RC time constant is determined by the capacitance of the capacitor C7 and the resistance of the resistor R9.

Therefore, even though the voltage level at the collector of the driving transistor Q3 becomes lower than the grand level and thus the driving transistor Q3 is turned off as shown in FIG. 11, the period during which the Colpitts oscillation circuit is oscillated can be longer because the potential at the base is abruptly raised because the RC time constant is much shorter than the cyclic period of the oscillation.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A non-contact electric power transmission apparatus comprising:
   a power supply unit, said power supply unit including
   a first oscillation circuit adapted to be able to oscillate at a first oscillation frequency and having a power primary winding;
   a signal secondary winding;
   a filter circuit connected to said signal secondary winding and adapted to extract positioning signals from signals induced in said signal secondary winding; and a driving control circuit which controls said first oscillation circuit such that said first oscillation circuit intermittently oscillates when said driving control circuit does not receive said positioning signals from said filter circuit, and such that said first oscillation circuit successively oscillates when said driving control circuit receives said positioning signals from said filter circuit;

a load unit, said load unit including
  a power secondary winding;
  a signal primary winding, said power secondary winding and said signal primary winding being adapted to be electromagnetically connected to said power primary winding and said signal secondary winding respectively when said load unit is placed at a predetermined position with respect to said power supply unit; and
  a second oscillation circuit adapted to be able to oscillate at a second oscillation frequency different from said first oscillation frequency and adapted to output signals having said second oscillation frequency to said signal primary winding when signals are induced in said power secondary winding and input to said second oscillation circuit; and said filter circuit being adapted to extract signals having said second oscillation frequency as said positioning signals.

2. A non-contact electric power transmission apparatus according to claim 1, wherein:
  said power primary winding and said signal secondary winding are wound around a single common core.

3. A non-contact electric power transmission apparatus according to claim 1, wherein:
  said power secondary winding and said signal primary winding are wound around a single common core.

4. A non-contact electric power transmission apparatus according to claim 1, wherein:
  said power primary winding and said signal secondary winding are wound around a first common core; and,
  said power secondary winding and said signal primary winding are wound around a second common core.

5. A non-contact electric power transmission apparatus according to claim 1, wherein:
  said first and second oscillation circuits are constructed such that said second oscillation frequency is higher than said first oscillation frequency.

6. A non-contact electric power transmission apparatus according to claim 1, wherein:
  said first and second oscillation circuits are constructed such that a ratio of said second oscillation frequency to said first oscillation frequency is substantially 20 to 1.

7. A non-contact electric power transmission apparatus according to claim 1, wherein:
  said first oscillation circuit is constructed so as to periodically and intermittently oscillates when said driving control circuit does not receive said positioning signals from said filter circuit.

8. A non-contact electric power transmission apparatus according to claim 7, wherein:
  said first oscillation circuit is constructed such that a ratio of a cyclic period of a periodic oscillation in said first oscillation circuit to a period during which said first oscillation circuit oscillates in said cyclic period is substantially 100 to 1.

9. A non-contact electric power transmission apparatus according to claim 1, further comprising:

an oscillation control circuit adapted to be able to stop oscillation of said second oscillation circuit even when signals are induced in said power secondary winding and input to said second oscillation circuit.

10. A non-contact electric power transmission apparatus according to claim 9, further comprising:
  a secondary battery charged by electric power induced in said power secondary winding, said oscillation control circuit being adapted to stop oscillation of said second oscillation circuit when voltage level of said secondary battery becomes higher than a predetermined voltage level.

11. A non-contact electric power transmission apparatus according to claim 1, wherein:
  said second oscillation circuit comprises an LC oscillation circuit having a coil and a capacitor, said coil of said LC oscillation circuit also operating as said signal primary winding.

12. A non-contact electric power transmission apparatus according to claim 11, further comprising:
  an oscillation control circuit adapted to be able to stop oscillation of said second oscillation circuit even when signals are induced in said power secondary winding and input to said second oscillation circuit.

13. A non-contact electric power transmission apparatus according to claim 11, further comprising:
  a switch adapted to stop oscillation of said LC oscillation circuit, said LC oscillation circuit including a series resonant circuit, said switch being provided between said series resonant circuit and ground.

14. A non-contact electric power transmission apparatus according to claim 11, wherein:
  said LC oscillation circuit includes a driving transistor and a diode provided between said coil of said LC oscillation circuit and a collector of said driving transistor.

15. A non-contact electric power transmission apparatus according to claim 11, wherein:
  said LC oscillation circuit includes a driving transistor, and a RC time constant when a potential at a base of said driving transistor is raised is determined so as to be much shorter than a cyclic period of an oscillation in said second oscillation circuit.

16. A non-contact electric power transmission apparatus comprising:
  a power supply unit, said power supply unit including:
    first oscillation means for oscillating at a first oscillation frequency and having a power primary winding;
    a signal secondary winding;
    filter means connected to said signal secondary winding and for extracting positioning signals from signals induced in said signal secondary winding; and
    driving control means for controlling said first oscillation means such that said first oscillation means intermittently oscillate when said driving control means do not receive said positioning signals from said filter means and such that said first oscillation means successively oscillate when said driving control means receive said positioning signals from said filter means;
  a load unit, said load unit including:
    a power secondary winding;
    a signal primary winding, said power secondary winding and said signal primary winding being adapted to be electromagnetically connected to said power primary winding and said signal secondary winding respectively when said load unit is placed at a predetermined position with respect to said power supply unit; and second oscillation means for oscillating at a second oscillation frequency different from said first oscillation frequency and adapted to output signals having said second oscillation frequency to said signal primary winding when signals are induced in said power secondary winding and input to said second oscillation means; and said filter means being adapted to extract signals having said second oscillation frequency as said positioning signals.

* * * * *